(12) United States Patent
Hazzard

(10) Patent No.: US 6,731,416 B2
(45) Date of Patent: May 4, 2004

(54) HOLOGRAPHIC PRIVACY FILTER FOR DISPLAY DEVICES

(75) Inventor: Thomas B. Hazzard, Providence, RI (US)

(73) Assignee: ttools, LLC, Jamestown, NY (US)

( * ) Notice: Subject to any disclaimer, the term of this patent is extended or adjusted under 35 U.S.C. 154(b) by 32 days.

(21) Appl. No.: 10/029,447

(22) Filed: Dec. 14, 2001

(65) Prior Publication Data

US 2002/0096985 A1 Jul. 25, 2002

Related U.S. Application Data

(60) Provisional application No. 60/255,554, filed on Dec. 14, 2000.

(51) Int. Cl.[7] .............................. G03H 1/22; G03H 1/28; G02B 27/00
(52) U.S. Cl. ............................... 359/24; 359/1; 359/22; 359/32; 359/613; 345/32
(58) Field of Search ................................ 359/1, 22, 25, 359/24, 32

(56) References Cited

U.S. PATENT DOCUMENTS

| | | | |
|---|---|---|---|
| 5,258,863 A | 11/1993 | Lungershausen et al. | 359/20 |
| 5,502,581 A | 3/1996 | Sudo et al. | 359/10 |
| 5,748,347 A | 5/1998 | Erickson | 359/23 |
| 6,369,919 B1 * | 4/2002 | Drinkwater et al. | 359/2 |
| 6,506,480 B2 * | 1/2003 | Liu et al. | 428/201 |
| 6,512,607 B1 * | 1/2003 | Windsor et al. | 359/15 |
| 2001/0039771 A1 * | 11/2001 | Town | 52/171.3 |

* cited by examiner

Primary Examiner—John Juba, Jr.
(74) Attorney, Agent, or Firm—Barlow, Josephs & Holmes, Ltd.

(57) ABSTRACT

A privacy filter for use on an electronic display screen, such as a PDA display screen or a laptop display screen, is constructed using holographic imaging technology. The privacy filter consists of a flexible, optically clear photopolymer film having a plurality of holographic images formed thereon. The key aspect of the present disclosure is constructing the master holographic images by imaging the master holographic recording plates at a severe side angle "off angle". By shooting the hologram at this "off angle", the resulting hologram is not visible to a person looking directly (perpendicularly) at the resulting hologram. However, the holograms are visible within the remaining fields of view to the right and to the left of center. Creation of the holograms in this manner creates an effective blocking tool for use in the context of a privacy filter. Unwanted onlookers attempting to view the display screen from the sides, the front or the back are presented with a holographic image rather than a view of the display.

28 Claims, 14 Drawing Sheets

HOLOGRAPHIC PRIVACY FILTER FOR DISPLAY DEVICES

This application claims the benefit of Provisional Application No. 60/255,554 filed dec. 14, 2000.

BACKGROUND AND SUMMARY OF THE INVENTION

The instant invention relates to privacy filters for electronic display devices, such as personal digital assistants (PDA's) and laptops, and more particularly to a privacy filter that makes use of holographic images to block the view of unwanted onlookers, but yet allow the operator to have an unobstructed view of the display screen.

Privacy filters for electronic display devices are well known in the electronic and optical arts. The growing use of electronic devices in public areas has driven a need in the industry to try to develop products which will protect private and confidential information from the view of unwanted onlookers, but yet allow the intended viewer, i.e. the user, to have a substantially unrestricted view of the display.

One important area of use for privacy filters is in the travel sector. Business travelers on planes and trains, etc., have an inherent need to be able to work while traveling. For the most part, almost every business traveler has a laptop or PDA device that when in use, will be generally visible to anyone sitting next to them, or somewhere behind them. The ever improving clarity and brightness of the displays of such devices makes the problem even worse as persons sitting a substantial distance away can view the substance of whatever is displayed on the device.

Another popular venue of use for privacy filters is in the medical field where confidential patient information is displayed on hospital computer screens. It is important that doctors, hospitals and other medical facilities make use of some type of privacy device on the screens of their computers to insure that other patients and unintended hospital staff cannot see patient information displayed on such computer screens. These types of computers typically have a conventional cathode ray tube (CRT) display, although, the use of Liquid Crystal Display (LCD) screens is growing more popular and affordable. LCD screens are the same type of screens that are used in laptop and PDA devices.

Privacy screens are also used in schools and libraries where a plurality of computers might be grouped together in a common area. Individuals using computers in these public circumstances may also want to prevent others from viewing confidential information.

In general, the object of a privacy filter is to prevent someone who is not directly in front of the display screen from being able to read the information displayed on the screen. Typically, the existing privacy filters provide about a 60 degree field of view directly in front of the display. The remaining 60 degree fields of view to the right and to the left of central field of view are blocked by one or more techniques of diffracting or blocking light waves. One known technique of blocking light is by the use of louvered echelon lenses formed on a flexible plastic sheet. The lenses are arranged at particular angles such that when the flexible plastic sheet is overlayed onto a display, a viewer directly in front of the screen can view the screen without substantial distortion. However, as the field of view is shifted to the left and right of the center, the screen appears to be black, as the louvered echelon lenses entirely block light from exiting the filter in those angled directions. This type of filter can be constructed in any size or shape. However, the one drawback is the cost of such filters. The cost of a filter for a single 12 inch laptop computer screen can exceed $85 retail. 15 inch versions of this type of filter can exceed $120. The purchase of quantities of such filters for schools and government bodies is almost prohibitive.

Another type of privacy filter does not entirely block the light from the side angles but rather diffuses or diffracts the light to a sufficient extent to blur the image displayed. This technique is effective for use with text displays as the individual words are unreadable from the side angles.

Still further, other types of filters make use of parallel grids or agglomerates of small particles suspended in a plastic matrix to diffuse or diffract light in a desired manner.

While each of the existing prior art privacy filters is effective for its intended purpose, there is nevertheless a continuing need in the industry for newer and less expensive products which will allow more widespread use and adoption.

The instant invention provides a privacy filter that makes use of holographic images to block the view of the display screen from side, front and rear angles, but yet allows the user to view the display screen from directly in front thereof, i.e. within the central field of view. More specifically, a privacy filter for use on an electronic display screen, such as a PDA display screen or a laptop display screen, is constructed using holographic imaging technology. The privacy filter consists of a flexible, optically clear photopolymer film having a plurality of holographic images formed thereon. The key aspect of the present disclosure is constructing the master holographic images by imaging the master holographic recording plates at a severe side angle "off angle" of about 60 degrees from center. Conventional hologram images are recorded at a standard angle of 45 degrees from center and are visible within the central field of view. By shooting the hologram images at this "off angle", the resulting hologram is not visible to a person within the central field of view looking directly (perpendicularly) at the resulting holographic film, but rather the viewable image of the hologram is shifted to the right or left depending from which side the image is recorded. This means that the holograms are now visible within the remaining fields of view to the right and to the left of center. Creation of the holograms in this manner creates an effective visibility blocking tool for use in the context of a privacy filter. Unwanted onlookers attempting to view the display screen from the sides, the front or the back are presented with a holographic image rather than a view of the display.

In its most basic form, the privacy screen comprises a single flexible sheet of photopolymer film having at least one holographic image formed therein. Since the view of the holographic images is shifted in the direction of the recording angle, it would normally be necessary to image two separate images, one from the right and one from the left, to achieve the desired effect of blocking from both sides. This, however, would require the use of two overlayed sheets of photopolymer film. It has been found as part of the invention, that if the holographic image is recorded at a 60 degree angle from the top center of the plate rather than from the left or right side, the resulting holographic image is visible from both the left side, right side, and the front. It was also found in the course of development that larger holograms tend only to be partially visible, depending on the angle at which they are viewed. Accordingly, in the preferred form of the invention, the photopolymer film is imaged with a plurality of individual, smaller holographic images that are arranged in a pattern across the surface of the film. By using a plurality of separate holographic images, each image independently becomes fully visible within the side privacy fields of view, i.e. the images all "pop" into view simultaneously, rather than seeing a gradual appearance of the image from one side to the other.

The privacy filter further preferably includes an layer of adherent material attached to the back of the photopolymer film to provide a means of adhering the film to a display screen. One type of adherent material is a layer of static cling vinyl which is effective for adhering the film to glass surface, such as found on many PDA screens and CRT screens. Another type of adherent material is a layer of pressure sensitive adhesive, such as used on self sticking post notes, which is effective for adhering the film to non-glass screens such as used in LCD laptops screens and other types of PDA's.

Still further, the privacy filter preferably includes a protective "anti-scratch" coating on the upper surface thereof, which protects the film and increases the life of the product.

In the manufacturing process of the master plates, each individual holographic image is separately recorded at the critical "off angle" and then the individual master recording plates are assembled together to form an array of individual plates. This array is then reproduced or "copied" to form a larger format master plate ($2^{nd}$ generation) which is then used for exposure of the photopolymer film. Preferably, the $1^{st}$ generation master plates are imaged without any object or pattern such that the holographic effect is simply the appearance of a plain greenish shade. When the array of $1^{st}$ generation master plates are copied, a mask with a two-dimensional stencil pattern is overlayed on the array to mask out the seems of the tiles and to create a repeating pattern in the holographic image. This 2-D pattern is then what becomes visible as the holographic images when the photopolymer film is exposed. Alternative methods of recording the holographic images include the use of blocking plates to remove ghosting effects, and the use of mask overlays in the creation of the $1^{st}$ generation master plates.

As briefly, discussed above, an alternative embodiment of the privacy filter makes use of two separate layers of photopolymer film overlayed to form a composite filter. In this case, each of photopolymer films are exposed with a master plate imaged from the extreme right side or the extreme left side. The resulting holographic images are very clearly seen from the left and right sides. The manner of constructing the holographic master plates is the same as discussed above, but must be carried out for each set of left and right images. Likewise, there are two processes of exposure and two sheets of photopolymer film.

The holographic images can also comprise images of three-dimensional (3-D) objects rather than 2-D patterns.

Accordingly, among the objects of the instant invention are: the provision of a privacy filter that prevents unwanted viewers from seeing the screen of an electronic device outside of a central field of view; the provision of a holographic privacy filter that displays holographic images to unwanted viewers outside of the central field of view; the provision of a holographic privacy filter for a PDA device; the provision of a privacy filter for a laptop computer screen; the provision of a privacy filter for CRT screens; the provision of holographic privacy filter that simultaneously displays a plurality of individually created holographic images within the obstructed fields of view; the provision of a holographic privacy filter that is inexpensive to manufacture and which can be mass produced at a low cost using known manufacturing methods; the provision of a method of constructing a holographic privacy filter; the provision of method of assembling a plurality of individual holographic tiles together to form a holographic privacy filter; the provision of such a method wherein a plurality of holographic tiles are assembled together to form a PDA-sized holographic privacy filter; and the provision of such a method wherein a plurality of holographic tiles are assembled together to form a laptop or CRT sized privacy filter.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
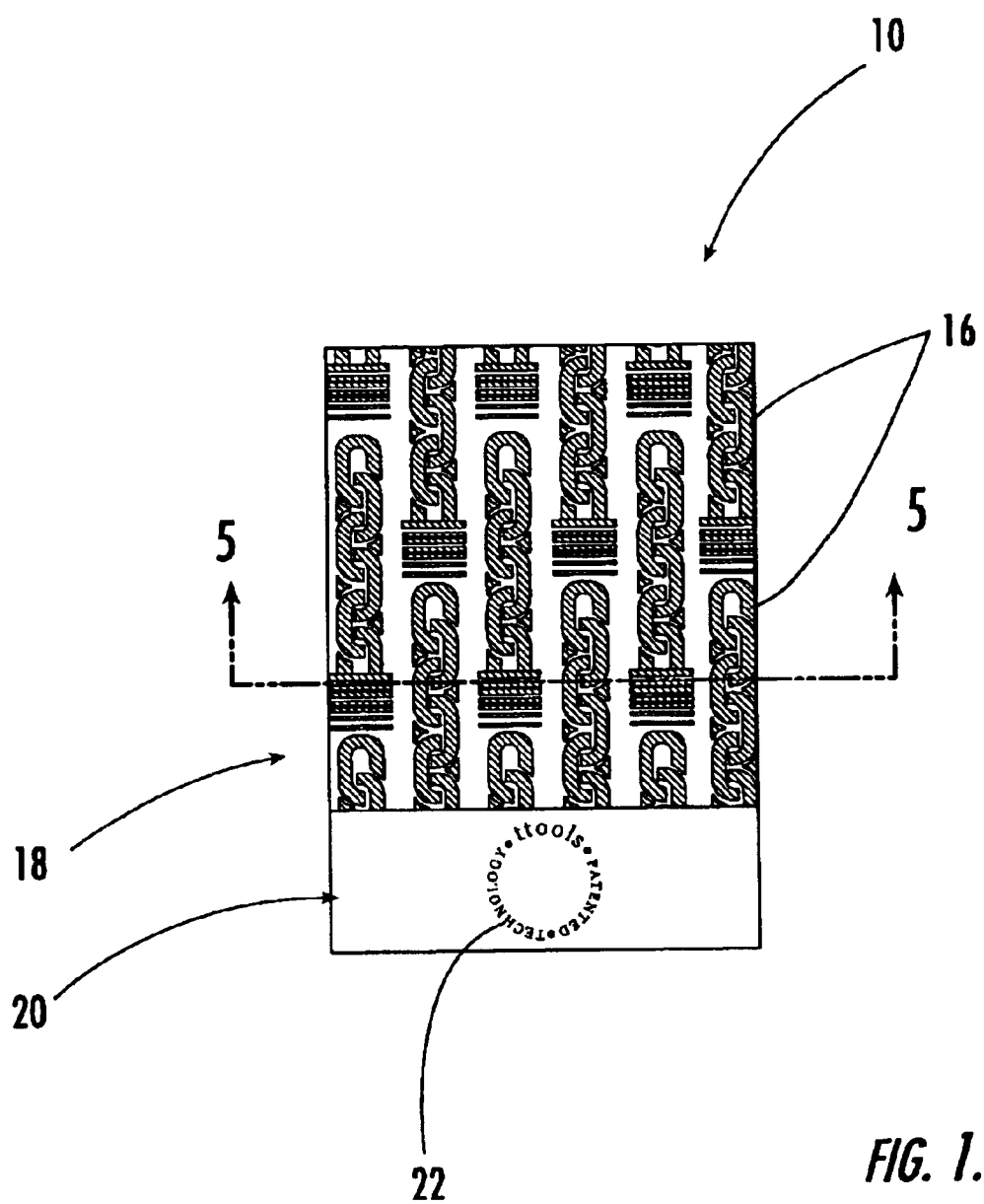
FIG. 1 is a plan view of the holographic privacy filter of the present invention.
Figure 2:
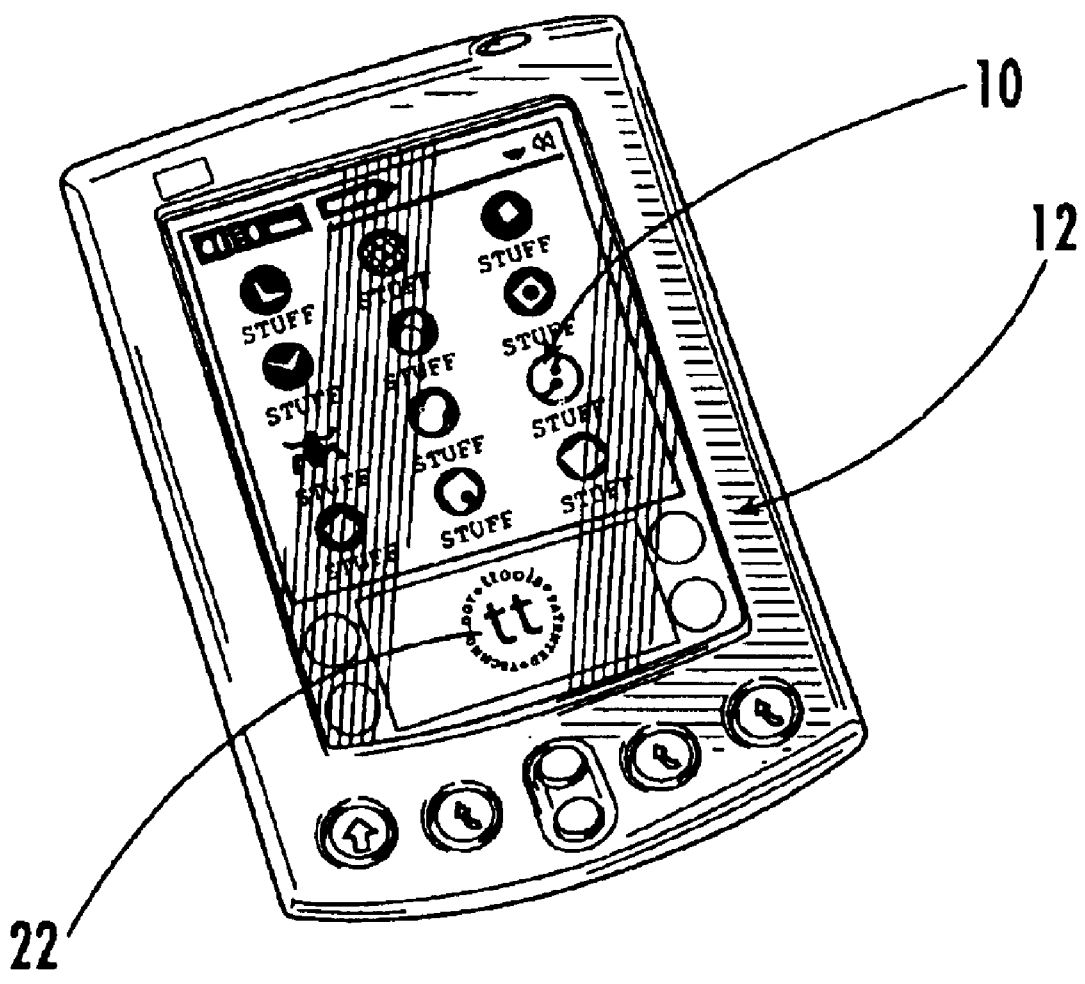
FIG. 2 is a front perspective view of a PDA with the holographic privacy filter of the present invention installed thereon.
Figure 3:
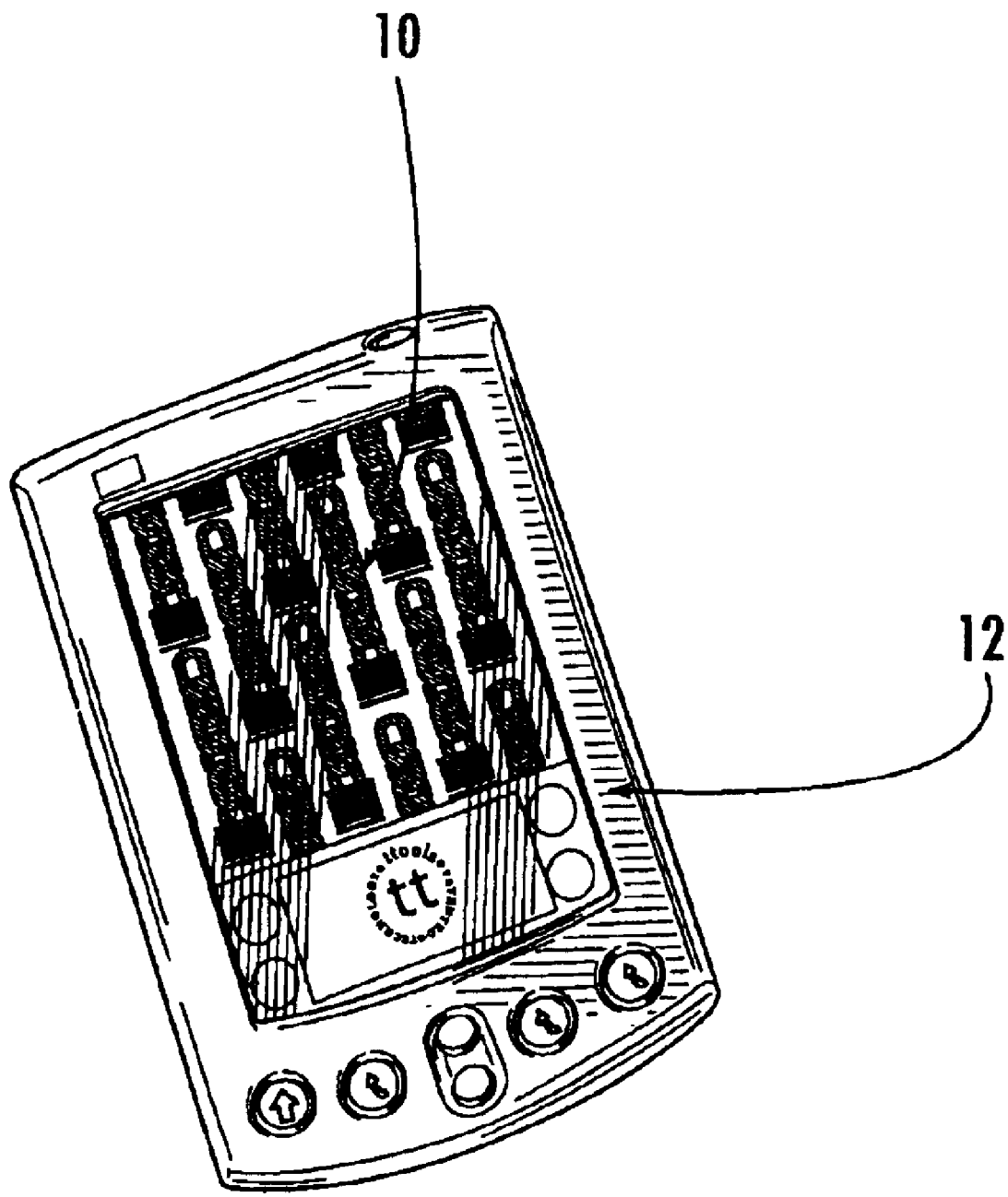
FIG. 3 is a side perspective (obstructed) view thereof showing the holographic images visible from the side angle.

Referring now to the drawings, the holographic privacy filter of the instant invention is illustrated and generally indicated at 10 in FIGS. 1–3. As will hereinafter be more fully described, the instant invention provides a privacy filter 10 that makes use of holographic images to block the view of the display screen from side, front and rear angles, but yet allows the user to view the display screen from directly in front thereof, i.e. within the central field of view.

Referring to FIGS. 1–5, the privacy filter 10 of the present invention is intended for use on an electronic display screen generally indicated at 12, such as a PDA display screen or a laptop display screen (See FIGS. 2 and 3). The privacy filter 10 consists of a flexible, optically clear photopolymer film substrate 14 having a plurality of holographic privacy images 16 formed thereon. The photopolymer film substrate 14 is conventional in the holographic arts and is of the same type used for conventional holography. Referring back to FIG. 1, the photopolymer film 14 is preferably provided with two separate areas 18, 20: the first area 18 is the top portion of the film 14 which is the privacy area that is provided with the novel holographic privacy images 16 of the present invention; and the second area 20 is the bottom portion of the film 14 which overlies the writing or input portion of the PDA screen 12. This bottom area 20 may be clear or may alternatively provided with a conventional hologram 22 for advertising or promotional purposes. This bottom portion 20 of the film 14 is not provided with the privacy holograms of the present invention and the scope of the inventive subject matter with regard to the privacy holograms should not be limited by this feature.

Figure 4:
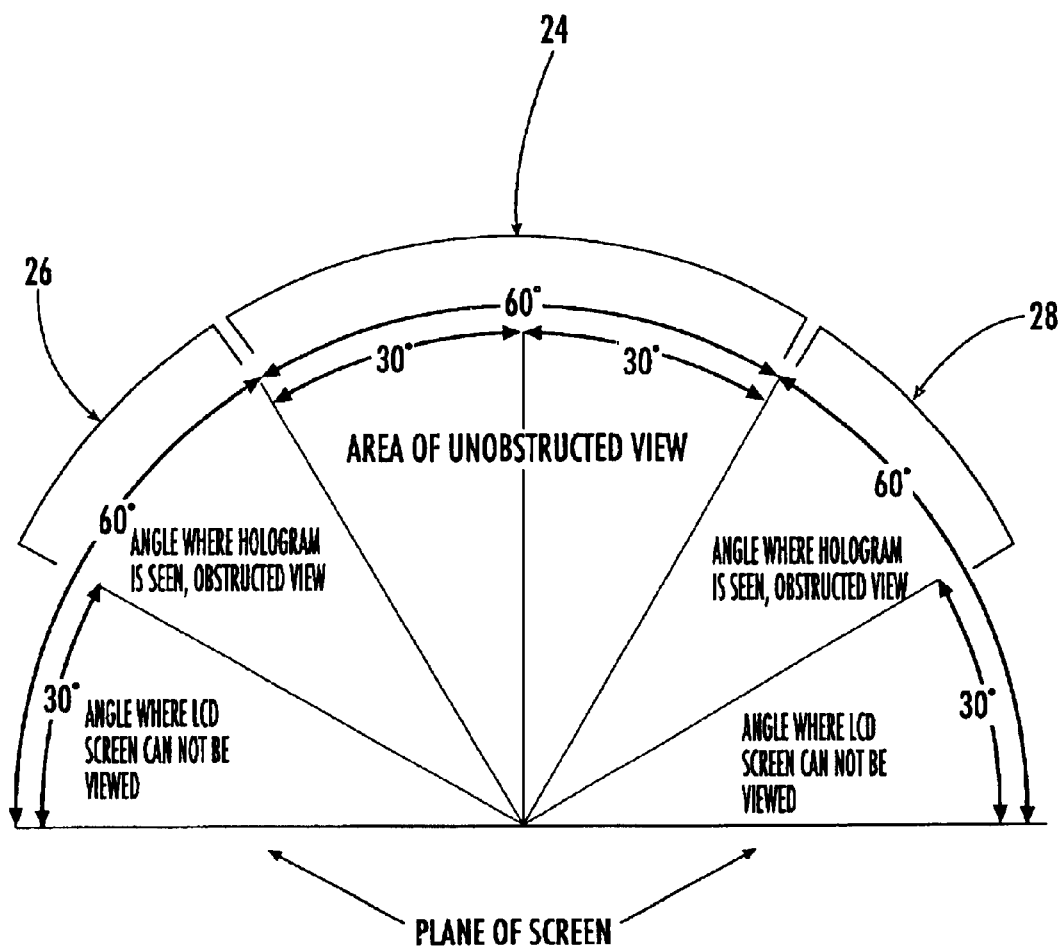
FIG. 4 is a schematic of the visible and obstructed viewing angles of the holographic privacy filter.
Figure 5:
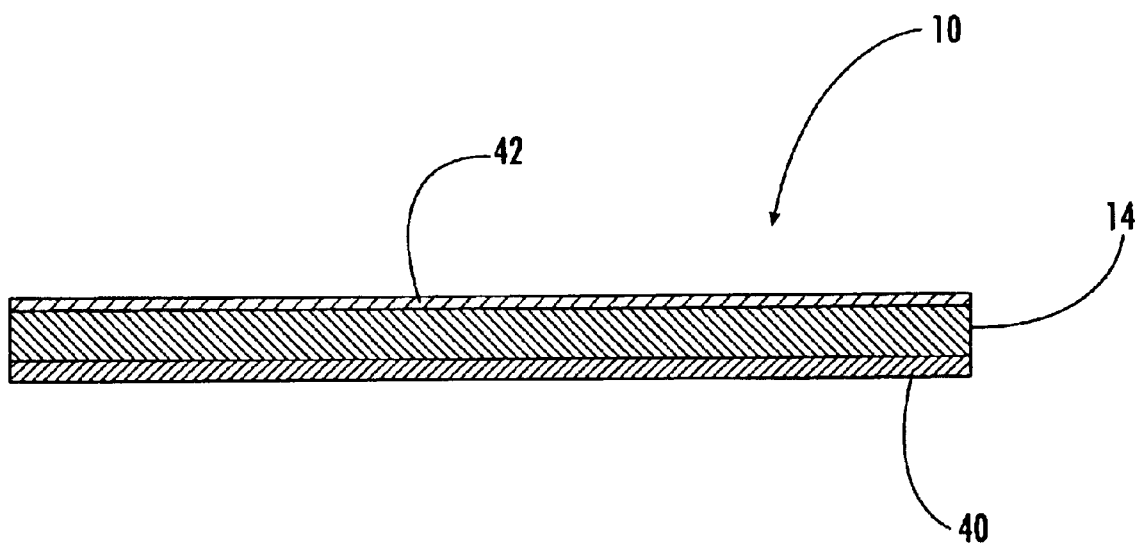
FIG. 5 is a cross-section of the holographic privacy filter as taken along line 5—5 of FIG. 1.

As shown in FIG. 2, when a user is positioned in front of the display screen 12, the privacy area 18 is fully visible and unobstructed. However, when the viewer shifts the viewing angle to either side, such as shown in FIG. 3, the privacy holograms 16 become visible and prevent viewing of the screen 12 from this side angle. Referring to FIG. 4, the plane of the privacy filter (or the plane of the display screen) is illustrated in conjunction with predefined fields of view. A central field of view extending for an angular dimension of about 60 degrees is indicated at 24 wherein the view of the display screen 12 is unobstructed. Left and right fields of view extending for about another 30 degrees are indicated at 26, 28 respectively wherein the holographic privacy images are visible. The remaining far left and far right fields adjacent to the plane of the screen 12 represent areas wherein the screen would not normally be visible to anyone, with or without the filter in place, simply due to visibility limitations of the screen display itself.

Figure 6:
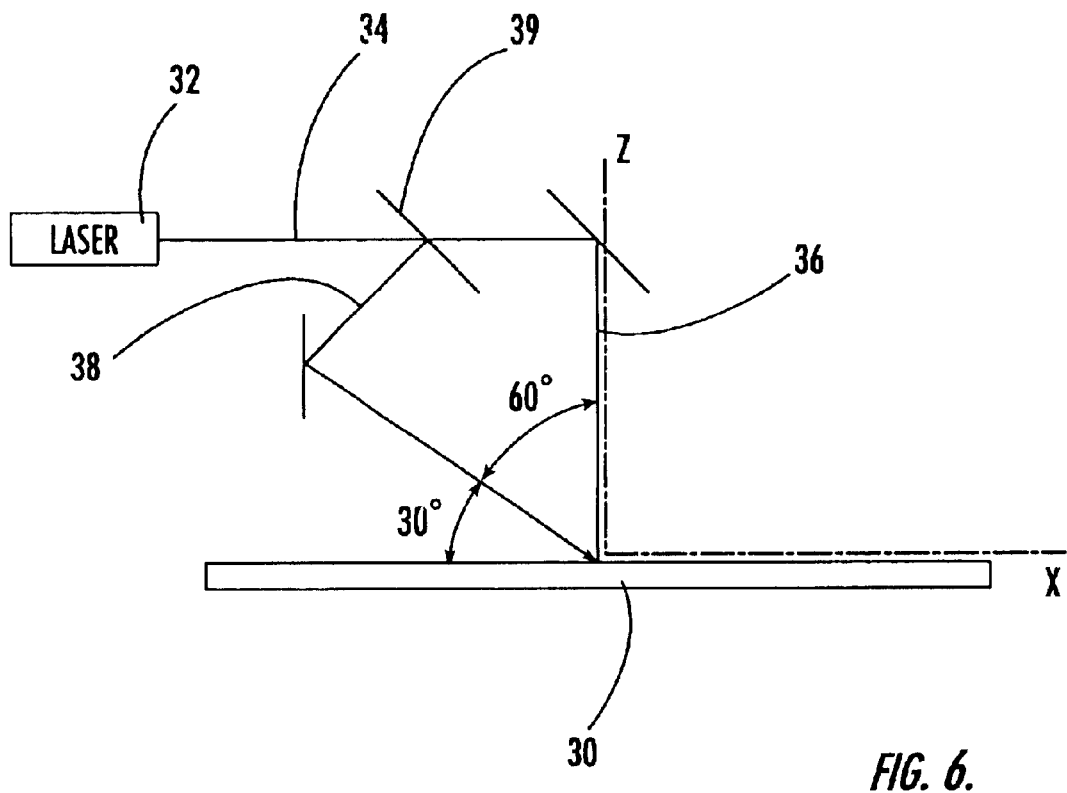
FIG. 6 is a schematic view of the imaging angles of the holographic image beam and reference beam at which the $1^{st}$ generation master holographic tile is constructed.

The key aspect of the present invention is constructing the master holographic images by imaging $1^{st}$ generation master holographic recording plates 30 at a severe side angle, or "off angle", of between about 50 degrees to about 60 degrees from center (See FIG. 6). Preferably, the images are recorded at an image beam angle of about 60 degrees from center. The recording plates are essentially the same as photographic film, the details of which are well known in the holographic arts.

In general, holograms are created using a laser source 32 that emits a beam of light 34 comprised of coherent light waves, i.e. all of the light waves are the same size, and vibrate in the same frequency. The single laser beam 34 is split into two beams 36, 38 by a beam splitter 39. In this manner, two laser beams 36, 38 having the same characteristics are provided. One of the split beams is the "reference beam" 36 that is shone directly onto the recording plate 30. The second beam 38 is the "image beam", which is either shone onto the recording plate at an angle or reflected off of an object. This object then becomes the image that appears in the hologram. Where the two laser beams intersect, they form an interference pattern that is recorded onto the recording plate. 3-D imaging will be discussed in greater detail later in the specification (see FIG. 16).

Conventional hologram images are recorded at standard angles of between about 30 degrees and about 45 degrees from center, i.e. the image beam is directed onto the recording plate at an angle of about 30 to 45 degrees. In this regard, the holographic images created at these angles are normally visible within the central field of view 24.

In contrast, the privacy holographic images 16 of the present invention are created by "shooting" the privacy hologram images at the "off angle" of between 50 degrees and about 60 degrees. The resulting privacy holograms are in turn not visible to a person within the central field of view 24, i.e. looking directly (perpendicularly) at the resulting holographic film, but rather the viewable image of the hologram 16 is shifted to the right or left field of view 26, 28 depending from which side the image is recorded. This means that the holograms 16 are now visible within the left and right fields of view 26, 28 to the right and to the left of center. Creation of the privacy holograms 16 in this manner creates an effective visibility blocking tool for use in the context of the privacy filter 10 of the present invention. Unwanted onlookers attempting to view the display screen 12 from the sides, the front or the back are presented with a holographic privacy image 16 rather than a view of the display screen 12.

In its most basic form, the privacy screen 10 comprises a single flexible sheet of photopolymer film substrate 14 having at least one holographic image 16 formed therein. Since the view of the holographic images 16 is shifted in the direction of the recording angle, it would normally be necessary to image two separate images, one from the right and one from the left, to achieve the desired effect of blocking from both sides. This, however, would require the use of two overlayed sheets of photopolymer film. This type of embodiment will described in a later portion of the specification, as an alternative embodiment.

Figure 7:
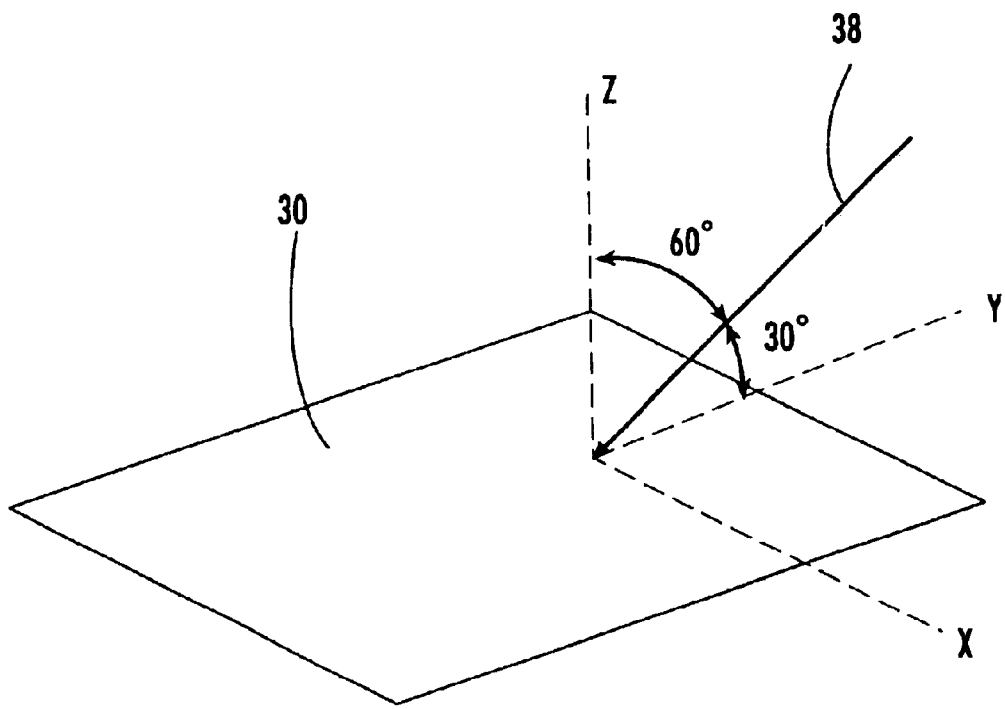
FIG. 7 is a schematic view of a single holographic tile with the holographic image beam being directed at an angle of 60 degrees from the top center of the tile in the Y–Z plane of reference.

To simplify the construction and reduce costs the preferred embodiment includes only a single photopolymer film 14 with a single set of images 16. It has been found as part of the present invention, that if the holographic image 16 is recorded at a 60 degree angle from the top center of the recording plate 30 (see FIG. 7) rather than from the left and/or right side, the resulting holographic image 16 is visible from both the left side, right side, and the front. Referring to FIG. 7, the image beam 38 is directed within the Y–Z plane of reference as illustrated.

It was also found in the course of development that larger holograms, i.e. larger in dimension, tend only to be partially visible at discreet angular positions, depending on the angle at which they are viewed, thus creating a gradual appearance and disappearance of the image as the angle of view is shifted. Accordingly, in the preferred form of the invention, the photopolymer film 14 is imaged with a plurality of individual, smaller holographic images 16 that are arranged in an array across the surface of the film 14. By using a plurality of separate holographic images 16, each image independently becomes fully visible within the side privacy fields of view 26, 28, i.e. the images all "pop" into view simultaneously, rather than seeing a gradual appearance of the image from one side to the other.

Referring back to FIG. 5, the privacy filter 10 further preferably includes a layer of adherent material 40 attached to the back of the photopolymer film 14 to provide a means of adhering the film 14 to the display screen 14. One type of adherent material 40 is a layer of static cling vinyl which is effective for adhering the film to glass surface, such as found on many PDA screens and CRT screens. Static cling vinyl materials are well known in the arts, and no further description is believed to be necessary for one skilled in the art to carry out the invention. Another type of adherent material 40 is a layer of pressure sensitive adhesive, such as used on self sticking post notes. This type of adherent is effective for adhering the photopolymer film 14 to non-glass screens such as used in LCD laptops screens and other types of PDA's. Pressure sensitive adhesive materials are also well known in the arts, and no further description is believed to be necessary for one skilled in the art to carry out the invention.

Still further, the privacy filter 10 preferably includes a protective "anti-scratch" coating 42 on the upper surface thereof, which protects the film 14 and increases the life of the product. Anti-scratch coatings for photopolymer films are conventional in the art, and no further description is believed to be necessary for one skilled in the art.

Figure 8:
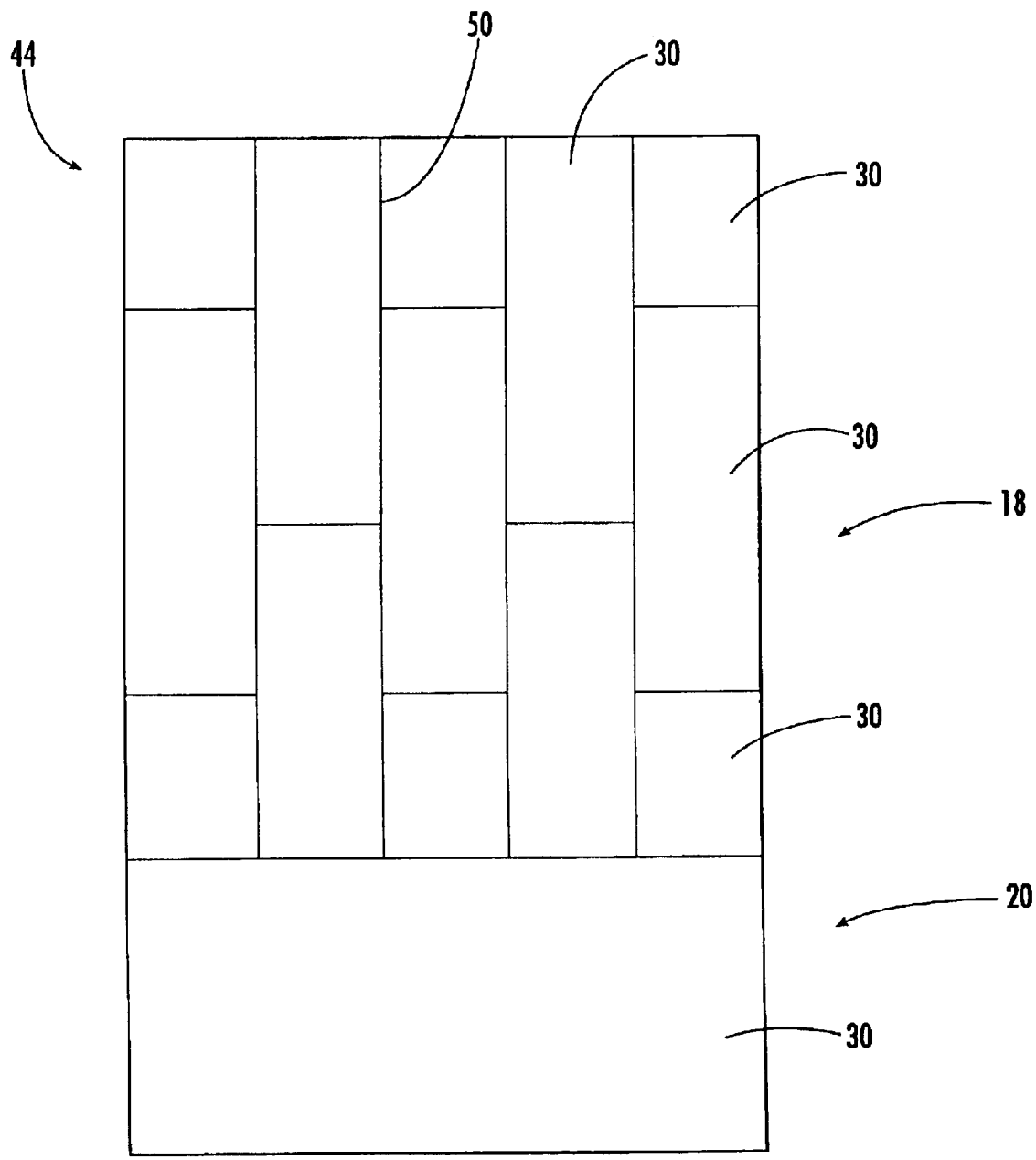
FIG. 8 is a plan view of a plurality of individual holographic tiles assembled to form the PDA-sized privacy filter of the present invention.

Turning now to FIGS. 6–8, in the manufacturing process of the master recording plates 30, each individual holographic image 16 is separately recorded at the critical "off angle" and then the individual master recording plates 30 are assembled together to form an array of individual plates 30 as generally indicated at 44 in FIG. 8. In general, recording of the holographic privacy images is accomplished using conventional laser light sources, mirrors, recording plates, etc. Accordingly, no further detailed description of the specific equipment involved in the process is believed to be necessary. As indicated above, the novelty and unique functionality of the privacy hologram lies in the unique angle at which the holographic image is created. In this regard, FIG. 8 shows an array 44 of individual master plates 30 assembled together in an array to form a master template for the presently described privacy screen for use on a PDA. Each of the master plates 30 in the upper area 18 is a master created using the present "off angle" method and recorded at an angle of about 60 degrees from center. The plate 30 in the bottom area 20 can be blank, or can be imaged with a design using the conventional 30–45 degree image beam angles to create a conventional hologram in the writing/input area. It is noted that the plates 30 in the upper portion are arrayed in an offset format simply as a matter of style for the application of a stencil pattern to be described hereinafter.

This assembled array 44 is then reproduced or "copied" to form a larger format master plate ($2^{nd}$ generation) (not shown) which is then used for exposure of the photopolymer film. Reproduction or copying of a master is a known technique in the holographic arts, and is accomplished using a laser light source.

Figure 9:
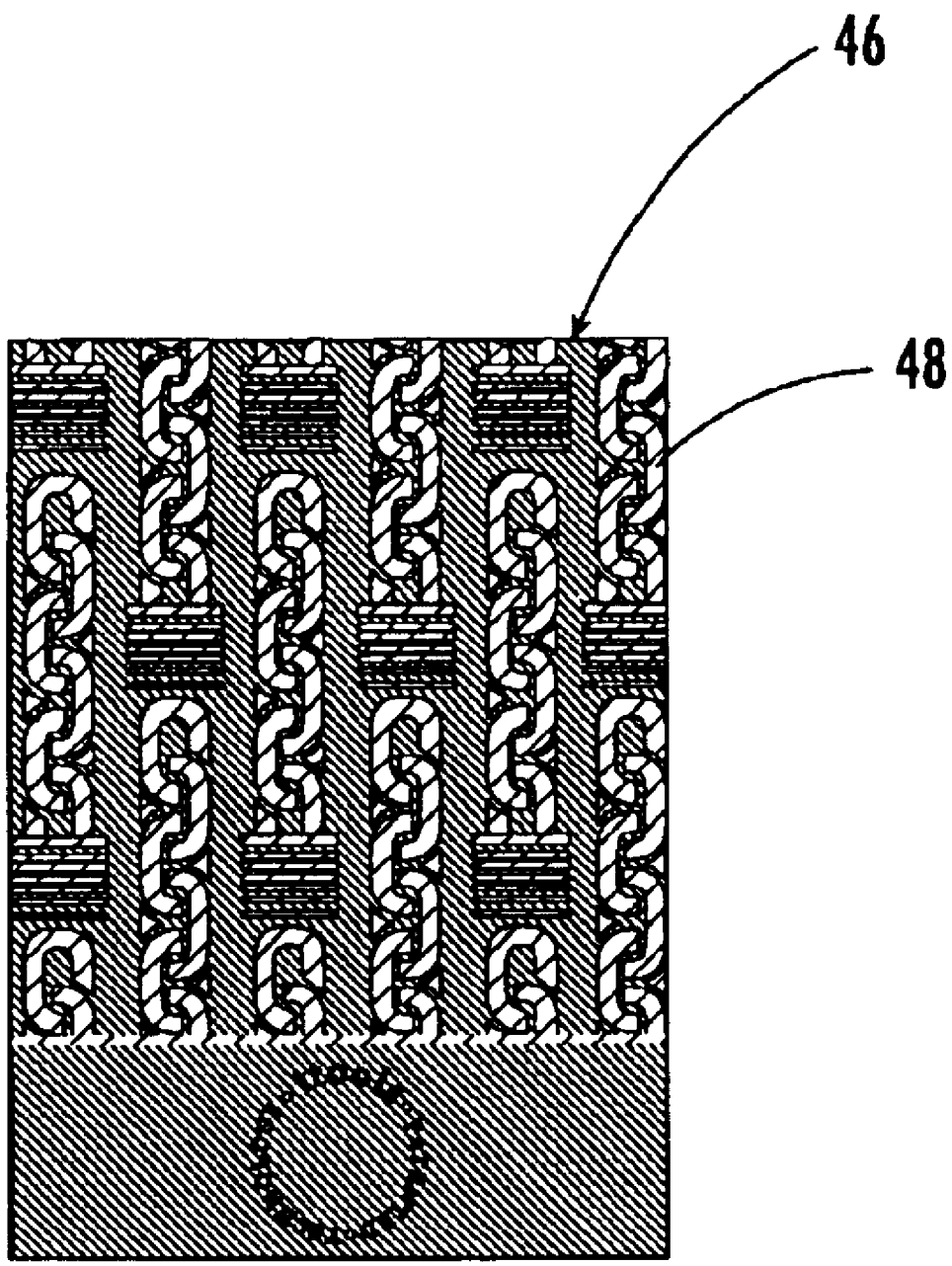
FIG. 9 is a plan view of a negative image mask overlayed onto the assembly of tiles of FIG. 8 and used to form the second generation master holographic tile.

Preferably, the $1^{st}$ generation master plates (FIG. 8) are imaged without any object or pattern such that the resulting holographic effect is simply the appearance of a plain green shade. Without any patterning, the resulting hologram would simply appear as a change of color from clear to obstructed. Referring to FIG. 9, when the array 44 of $1^{st}$ generation master plates 30 is copied, a negatively imaged mask 46 with a two-dimensional (2-D) stencil pattern 48 is overlayed on the array 44 to mask out the seams 50 between the abutting plates 30 and to create the repeating pattern of images 16 on the recording plate of the $2^{nd}$ generation master. This 2-D pattern 48 is then what becomes visible as the holographic images 16 when the $2^{nd}$ generation master plate is exposed onto the photopolymer film 14.

Exposure of the $2^{nd}$ generation master onto the photopolymer film is them accomplished as with all other holograms, similar to the processing of color print film. The master negative, or recording, is exposed onto a section of photopolymer film 14 which is chemically altered by the exposure, resulting in the holographic image 16 or images 16. In this way, the entire array of images is transferred in a single exposure onto the sheet of photopolymer film 14.

Figure 10:
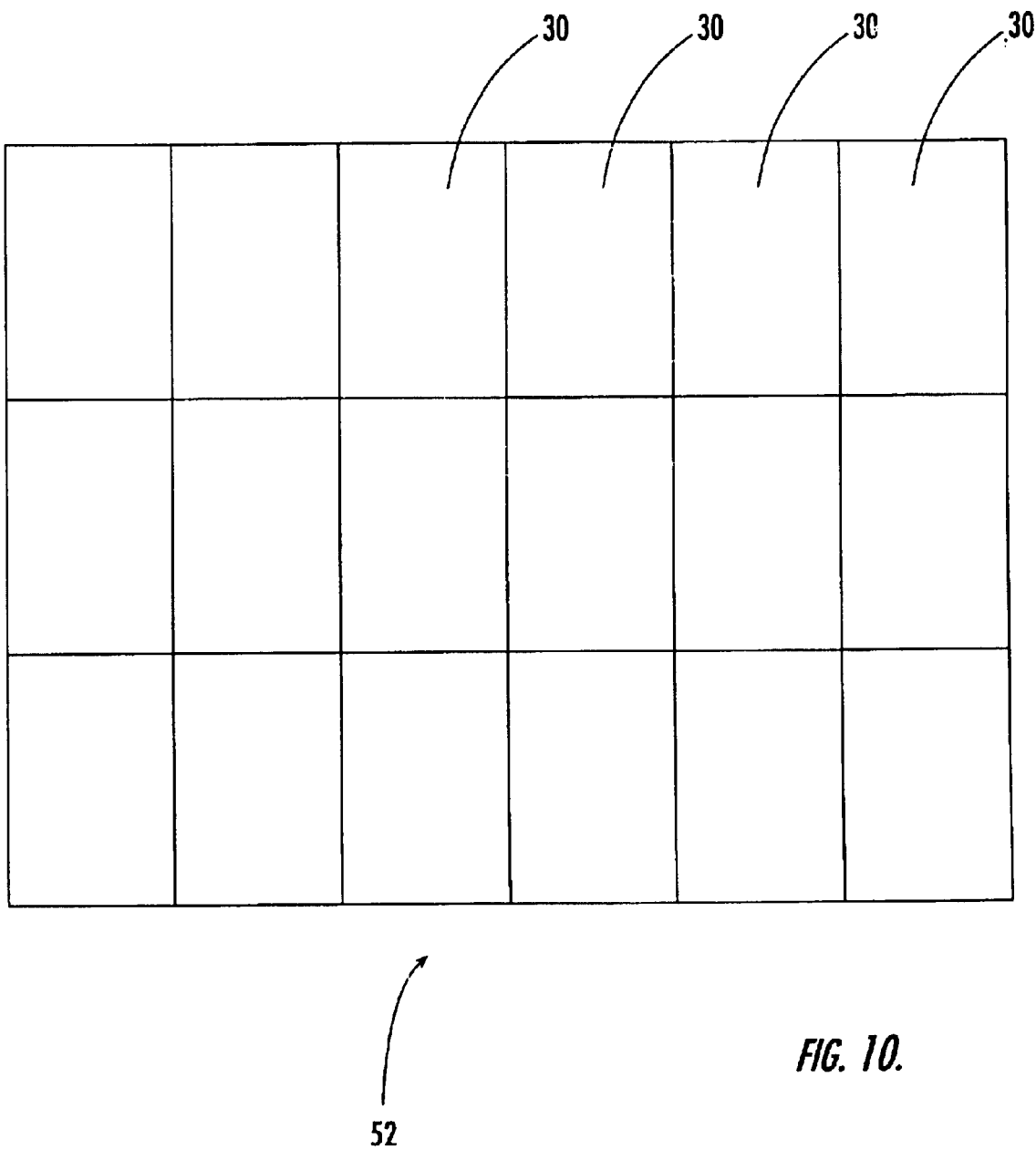
FIG. 10 is a plan view of a plurality of individual holographic tiles assembled to form a larger format laptop-sized holographic privacy filter.

Referring briefly to FIG. 10, it can be seen that the same general concept of arraying the small individual master plates 30 is also effectively used in connection with the creation of a $2^{nd}$ generation master to be used for laptop filters. An array 52 of $1^{st}$ generation master plates 30 is arranged in a rectangular pattern so as to fill the area of a larger format laptop screen display. As indicated hereinabove with respect to the smaller PDA privacy filter, there is an inherent limitation in the visibility of an individual privacy hologram if it is spread over too large an area. The holographic image tends to appear and disappear gradually as the field of view is shifted. There is also a manufacturing limitation in that the size of the standard holographic recording plates is smaller than the smallest size of laptop display, and the fixtures in which the recording plates are held are simply not designed to record such large plates at the extreme angles required for the desired effect. Accordingly, it is preferable from both a manufacturing and functional effect to create the $2^{nd}$ generation master for the laptop display as an array 52 of a plurality of individual $1^{st}$ generation master plates 30 and then copy this array 52 into a larger recording plate using conventional copying techniques. This technique can therefore be used to create an infinite variety of sizes for the filter as well as provide infinite flexibility in the arrangement of holographic images.

Figure 11:
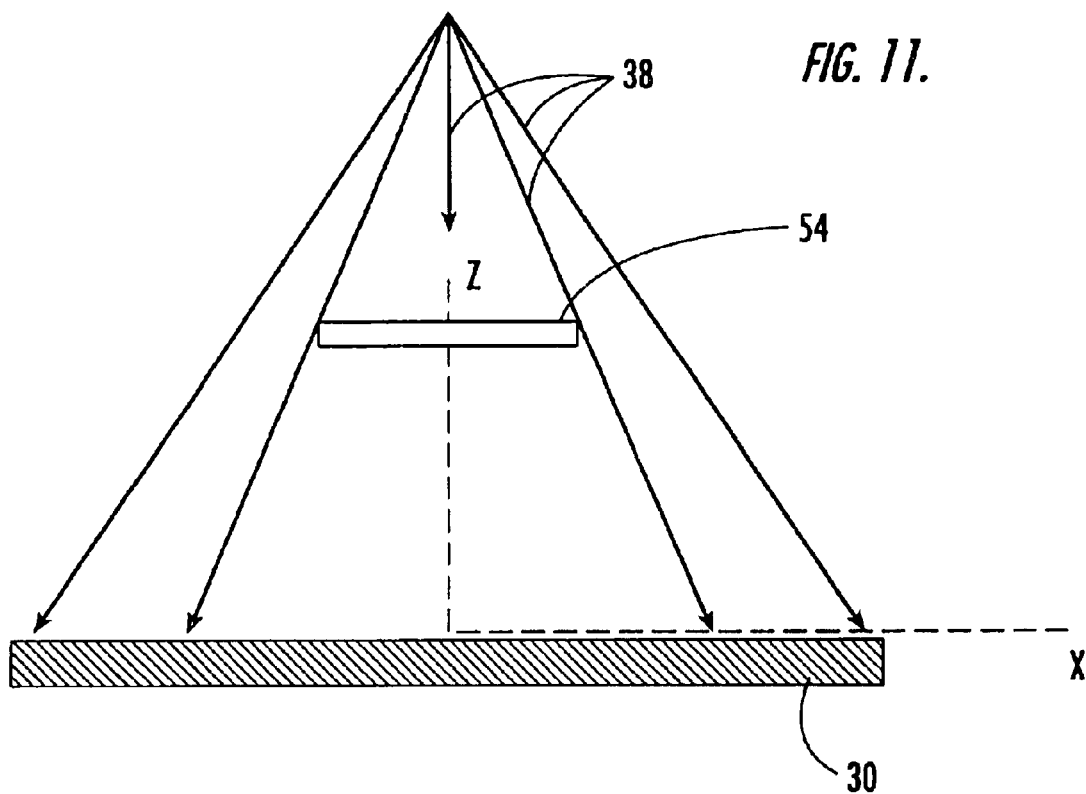
FIG. 11 is a schematic view of a first alternative method of imaging the holographic tiles using a blocker panel during formation of the $1^{st}$ generation master holographic tiles.

Turning to FIG. 11, an alternative methods of recording the holographic images includes the use of a blocking plate 54 to remove "ghosting" effects from the central field of view. "Ghosting" is a latent shadow of the holographic image 16 that can appear within the central field of view 24. While the holographic image 16 is not clearly visible, a faint "ghost" of the image is visible at some angles. It has been found that the use of a blocking plate 52 during creation of the $1^{st}$ generation master will significantly reduce the appearance of the ghost image from the central field of view.

Figure 12:
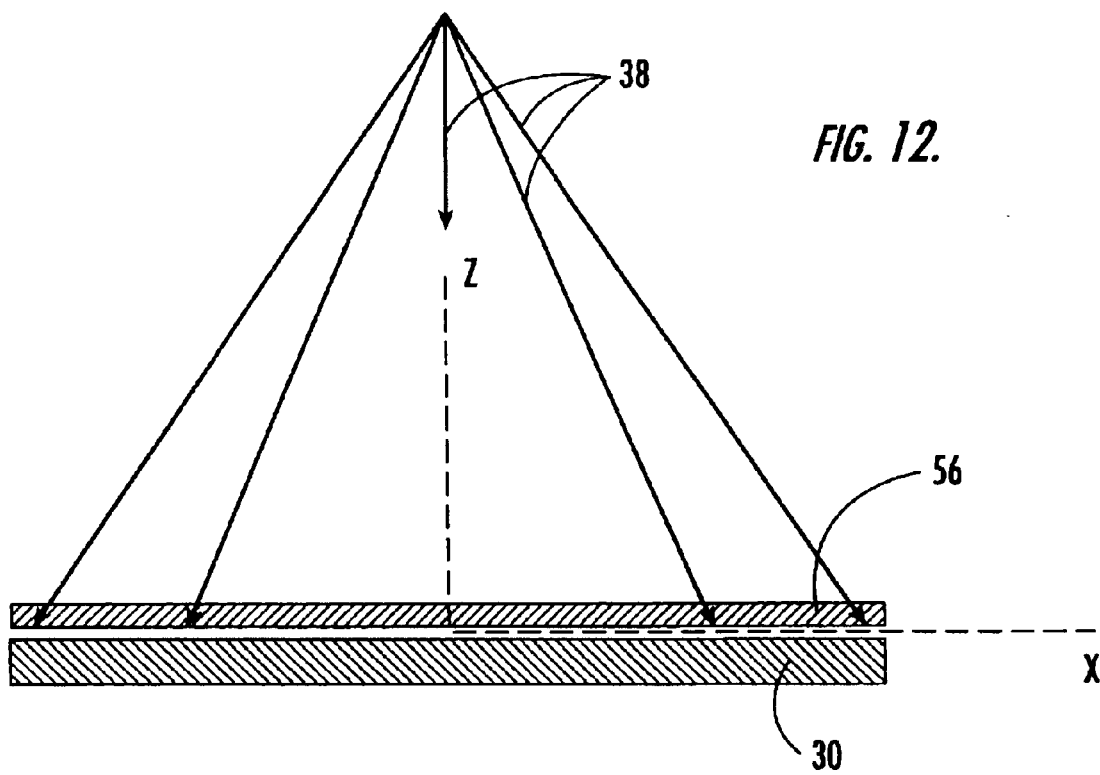
FIG. 12 is a schematic view of a second alternative method of imaging the holographic tiles using a mask during formation of the $1^{st}$ generation master holographic tiles.

Turning to FIG. 12, it is also possible to make use of a mask overlay 56 in the creation of the $1^{st}$ generation master plates rather than form the patterned image during reproduction. However, even reproduction of an array of tiles each having the pattern already applied will nevertheless require some type of mask to block the intersecting seams 50 wherein the master plates 30 are abutted.

Figure 13:
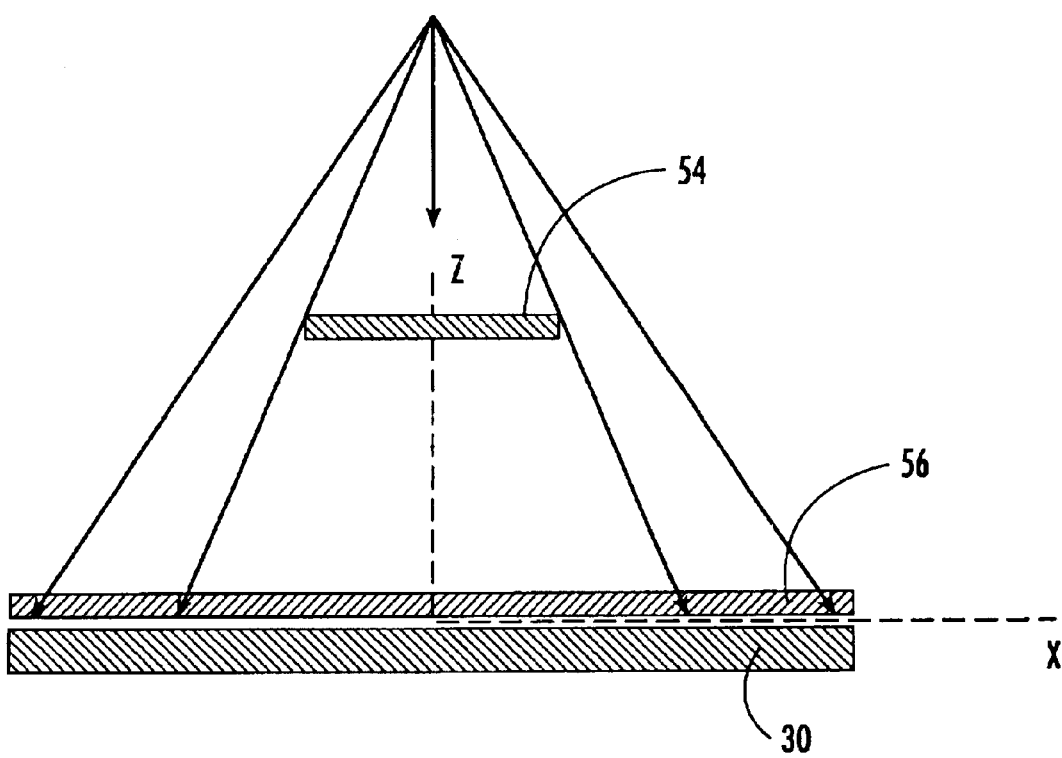
FIG. 13 is yet another schematic view of a third alternative method of imaging the holographic tiles using both the blocker panel and the mask during formation of the $1^{st}$ generation master holographic tiles.

Turning to FIG. 13, as yet another alternative, it is further possible to utilize both the blocking plate 54 and the mask 56 together in the creation of the $1^{st}$ generation master plate.

Figure 14:
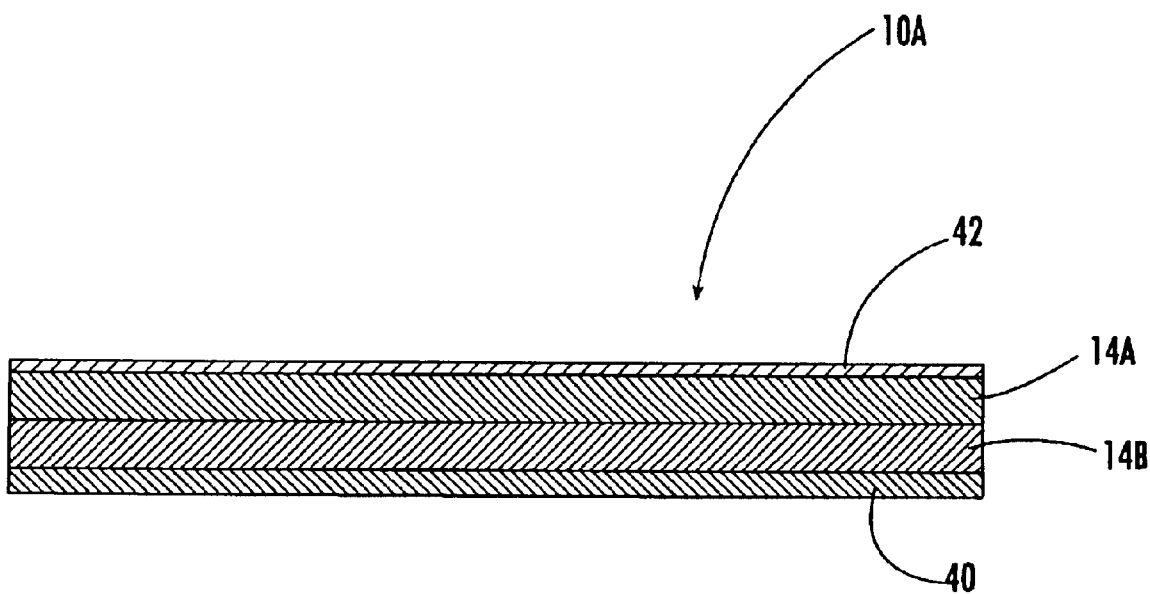
FIG. 14 is a cross-sectional view of a second embodiment of the privacy filter of the present invention showing two photopolymer holographic film layers.
Figure 15A:
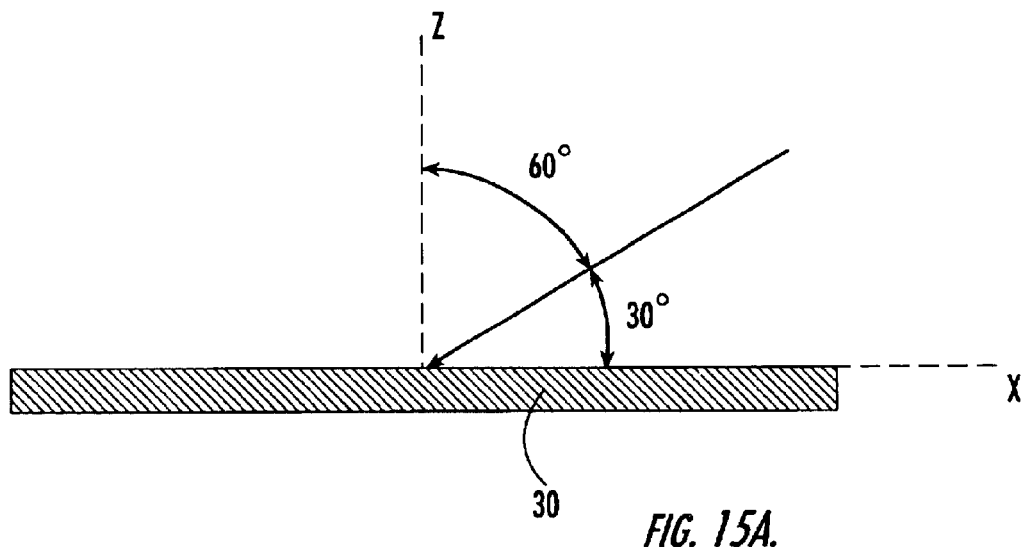
FIGS. 15A and 15B are cross-sectional views of the opposite angles at which the holographic image beams are directed at the separate $1^{st}$ generation holographic tiles which are used to form the separate holographic image layers.
Figure 15B:
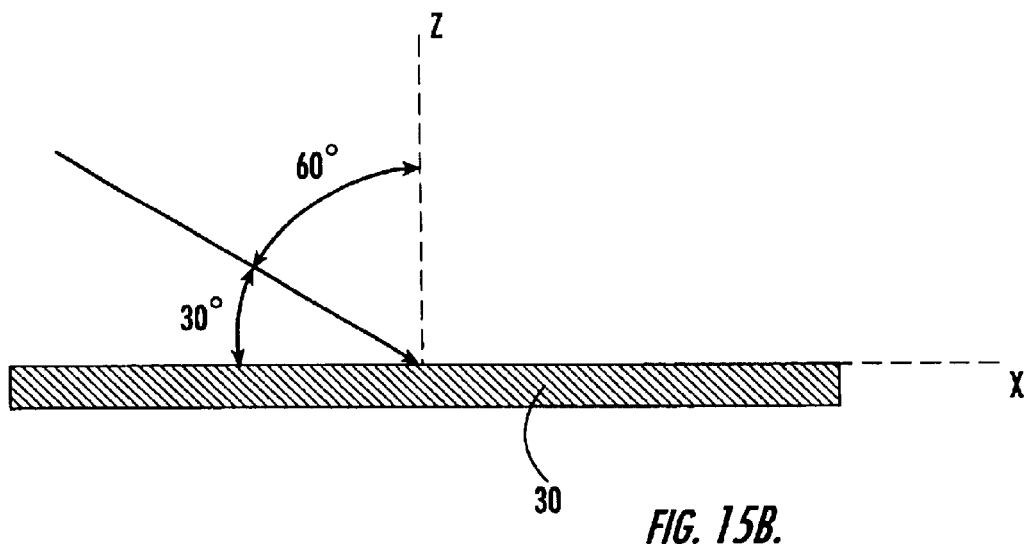

As briefly, discussed above, an alternative embodiment of the privacy filter 10A (FIG. 14) makes use of two separate layers of photopolymer film overlayed to form a composite filter. In this case, the privacy filter 10A comprises a first layer of photopolymer film 14A having an array of privacy holograms 16A which are visible from one side field of view, a second layer of photopolymer film 14B having an array of privacy holograms 16B which are visible from an opposing side field of view, a layer of adherent material 40 and a protective coating 42. In this regard, each of the first and second layers of photopolymer film 14A, 14B are exposed from a master template that is imaged either from the extreme right side or the extreme left side (See FIGS. 15 and 16). When the exposed photopolymer films 14A, 14B are overlayed, they cooperate to provide the privacy effect from both the right and the left side. The resulting holographic images are very clearly seen from both the left and right sides as well as the front. The manner of constructing the two sets of holographic master plates with opposing image views is the same as discussed above. However, the amount of work and materials is double because the same procedure must be carried out for each set of left and right images. Likewise, there are two processes of exposure and two sheets of photopolymer film.

Figure 16:
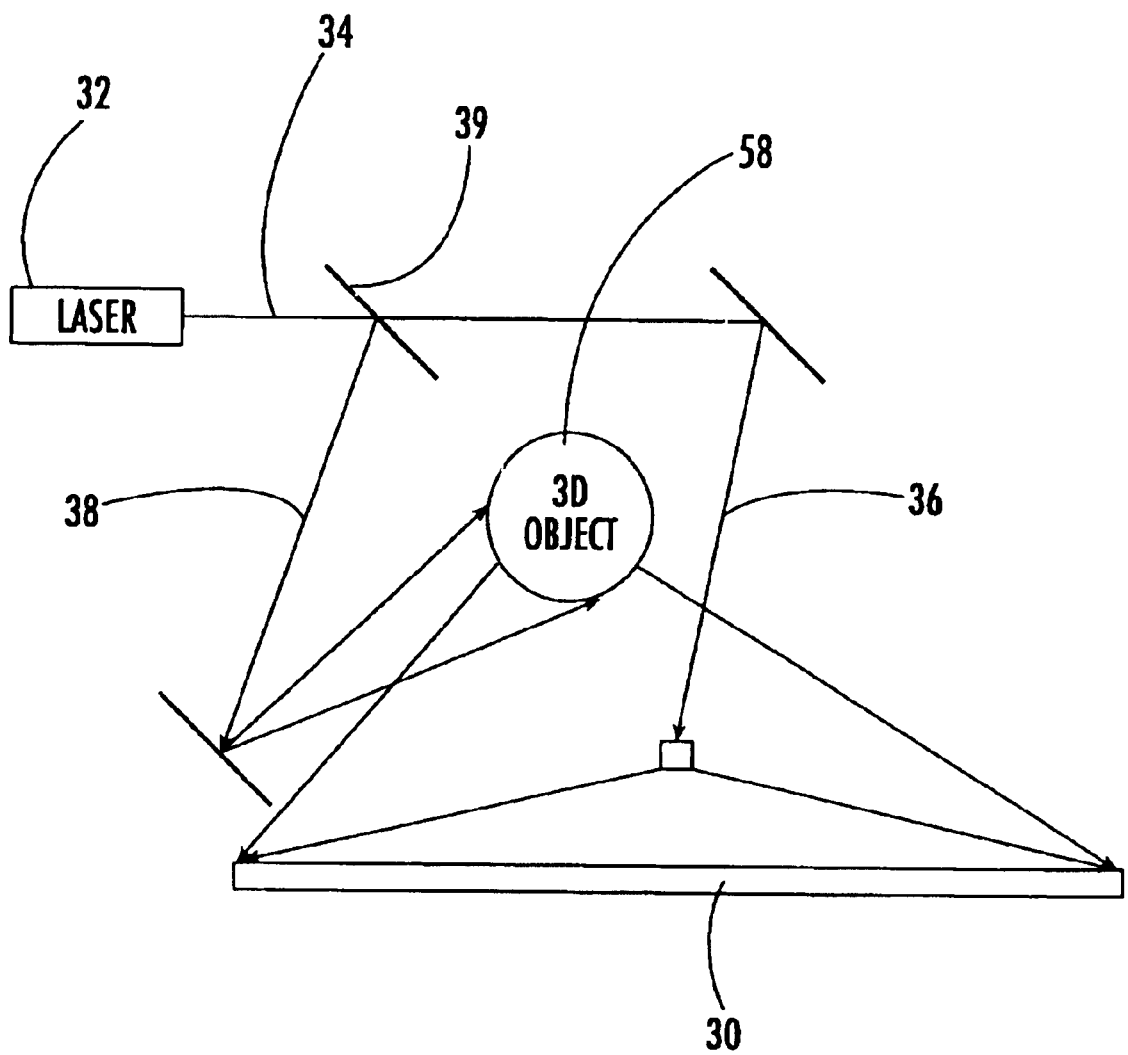
FIG. 16 is a schematic view of yet another alternative method including the imaging of a three-dimensional object for use in the holographic image.

The holographic privacy images 16 as previously discussed herein, have been described as being formed from 2-D stencil patterns 46. However it is to be understood that the images 16 can also be recorded in three-dimensional format through the imaging of a (3-D) object 58 rather than 2-D patterns. An exemplary method is illustrated in FIG. 16.

It can therefore be seen that the instant invention provides a unique and novel privacy filter 10 that prevents unwanted viewers from seeing the screen of an electronic device outside of a central field of view. The instant invention achieves this objection through the creative use of modified holographic privacy images 16 that are displayed to unwanted viewers outside of the central field of view. The process of recording the holographic images 16 at an extreme "off angle" is considered to be novel in that this technique is exactly opposite to the conventional formation of holograms which have exclusively been imaged for the best possible visibility within the central field of view. Furthermore, because the manufacturing and production techniques are built upon a well known and widely used technology, the invention is believed to be of significant commercial value in that it is easily adaptable to small and large formats and easily put into mass production. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A privacy filter for use on an electronic display screen comprising:
    a flexible sheet of photopolymer film having a 180 degree field of view perpendicular to a first side of said sheet,
    said sheet of photopolymer film having at least one holographic image exposed thereon wherein
        no holographic image is viewable within a central field of view,
        said display screen is viewable through said photopolymer film within said central field of view, and
        said at least one holographic image is visible within left and right holographic fields of view disposed to the left and right sides of said central field of view.

2. The privacy filter of claim 1 wherein said central field of view is about 45 to about 60 degrees in angular dimension symmetrically centered about a centerline extending perpendicular to said sheet.

3. The privacy filter of claim 1 wherein said left and right holographic fields of view are about 30 to about 45 degrees in angular dimension symmetrically arranged on opposing sides of said central field of view.

4. The privacy filter of claim 2 wherein said left and right holographic fields of view are about 30 to about 45 degrees in angular dimension symmetrically arranged on opposing sides of said central field of view.

5. The privacy filter of claim 1 wherein said central field of view is about 60 degrees in angular dimension symmetrically centered about a centerline extending perpendicular to said sheet and said left and right holographic fields of view are about 30 degrees in angular dimension symmetrically arranged on opposing sides of said central field of view.

6. The privacy filter of claim 1 wherein said at least one holographic image comprises a plurality of individual holographic images arranged in a predetermined pattern on said sheet of photopolymer film.

7. The privacy filter of claim 6 wherein said central field of view is about 45 to about 60 degrees in angular dimension symmetrically centered about a centerline extending perpendicular to said sheet.

8. The privacy filter of claim 7 wherein said left and right holographic fields of view are about 30 to about 45 degrees in angular dimension symmetrically arranged on opposing sides of said central field of view.

9. The privacy filter of claim 6 wherein said left and right holographic fields of view are about 30 to about 45 degrees in angular dimension symmetrically arranged on opposing sides of said central field of view.

10. The privacy filter of claim 6 further comprising a layer of adhering material disposed on a second side of said photopolymer film for adhering said photopolymer film to the surface of a display screen.

11. The privacy filter of claim 10 wherein said layer of adhering material comprises a sheet of static cling vinyl.

12. The privacy filter of claim 10 wherein said layer of adhering material comprises a layer of a pressure sensitive adhesive.

13. The privacy filter of claim 10 still further comprising a protective coating disposed on said first side of said photopolymer film.

14. The privacy filter of claim 1 further comprising a layer of adhering material disposed on a second side of said photopolymer film for adhering said photopolymer film to the surface of a display screen.

15. The privacy filter of claim 14 wherein said layer of adhering material comprises a sheet of static cling vinyl.

16. The privacy filter of claim 14 wherein said layer of adhering material comprises a layer of a pressure sensitive adhesive.

17. The privacy filter of claim 14 still further comprising a protective coating disposed on said first side of said photopolymer film.

18. A privacy filter for use on an electronic display screen comprising:
    a first flexible sheet of photopolymer film having a 180 degree field of view perpendicular to a first side of said sheet,
    said sheet of photopolymer film having at least one holographic image exposed thereon wherein
        no holographic image is visible within a central field of view,
        said display screen is viewable through said photopolymer film within said central field of view, and
        said at least one holographic image is visible within a left holographic field of view disposed to the left of said central field of view; and
    a second flexible sheet of photopolymer film having a 180 degree field of view perpendicular to a first side of said sheet, said sheet of photopolymer film having at feast one holographic image exposed thereon wherein
no holographic image is visible within a central field of view,
said display screen is viewable through said photopolymer film in said central field of view, and
said at least one holographic image is visible within a right holographic field of view disposed to the right of said central field of view,
said first photopolymer film being disposed in overlying relation with said second photopolymer film.

19. The privacy filter of claim 18 wherein said central field of view is about 60 degrees in angular dimension symmetrically centered about a centerline extending perpendicular to said sheet and said left and right holographic fields of view are about 30 degrees in angular dimension symmetrically arranged on opposing sides of said central field of view.

20. The privacy filter of claim 19 further comprising a layer of adhering material disposed on a second side of said second photopolymer film for adhering said photopolymer film to the surface of a display screen.

21. The privacy filter of claim 20 wherein said layer of adhering material comprises a sheet of static cling vinyl.

22. The privacy filter of claim 20 wherein said layer of adhering material comprises a layer of a pressure sensitive adhesive.

23. The privacy filter of claim 20 still further comprising a protective coating disposed on said first side of said first photopolymer film.

24. The privacy filter of claim 18 wherein said at least one holographic image in each of said first and second sheets of photopolymer films comprises a plurality of individual holographic images arranged in a predetermined pattern on said first and second sheets of photopolymer film.

25. The privacy filter of claim 18 further comprising a layer of adhering material disposed on a second side of said second photopolymer film for adhering said photopolymer film to the surface of a display screen.

26. The privacy filter of claim 25 wherein said layer of adhering material comprises a sheet of static cling vinyl.

27. The privacy filter of claim 25 wherein said layer of adhering material comprises a layer of a pressure sensitive adhesive.

28. The privacy filter of claim 25 still further comprising a protective coating disposed on said first side of said first photopolymer film.

* * * * *